(12) United States Patent
Howell et al.

(10) Patent No.: US 7,650,514 B2
(45) Date of Patent: Jan. 19, 2010

(54) SCALABLE LEASES

(75) Inventors: Jonathan R. Howell, Seattle, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 11/275,435

(22) Filed: Dec. 30, 2005

(65) Prior Publication Data
US 2007/0156588 A1 Jul. 5, 2007

(51) Int. Cl.
G06F 21/22 (2006.01)
G06F 9/46 (2006.01)
H04L 9/00 (2006.01)

(52) U.S. Cl. ........................................ 713/193; 713/100
(58) Field of Classification Search .................. None
See application file for complete search history.

(56) References Cited

U.S. PATENT DOCUMENTS

| | | | |
|---|---|---|---|
| 5,778,395 A | 7/1998 | Whiting et al. | |
| 5,805,900 A * | 9/1998 | Fagen et al. .................. | 710/220 |
| 5,832,529 A * | 11/1998 | Wollrath et al. ............. | 707/206 |
| 6,237,009 B1 | 5/2001 | Waldo et al. | |
| 6,353,869 B1 * | 3/2002 | Ofer et al. .................... | 710/200 |
| 6,473,819 B1 * | 10/2002 | Jackson et al. .............. | 710/200 |
| 6,643,650 B1 | 11/2003 | Slaughter et al. | |
| 6,658,417 B1 | 12/2003 | Stakutis et al. | |
| 6,671,821 B1 | 12/2003 | Castro et al. | |
| 6,862,666 B2 * | 3/2005 | Chong et al. ................ | 711/152 |
| 6,898,288 B2 * | 5/2005 | Chui ........................... | 380/278 |
| 6,920,559 B1 * | 7/2005 | Nessett et al. ................ | 713/168 |
| 6,986,044 B1 * | 1/2006 | Inada .......................... | 713/170 |
| 7,065,618 B1 | 6/2006 | Ghemawat et al. | |
| 7,315,926 B2 * | 1/2008 | Fridella et al. .............. | 711/163 |
| 7,346,720 B2 * | 3/2008 | Fachan ........................ | 710/200 |
| 7,350,226 B2 | 3/2008 | Moriconi et al. | |
| 7,376,744 B2 * | 5/2008 | Loaiza et al. ............... | 709/229 |
| 7,480,939 B1 * | 1/2009 | Nessett et al. ................. | 726/22 |
| 2002/0147719 A1 | 10/2002 | Zhang et al. | |
| 2002/0188605 A1 | 12/2002 | Adya et al. | |
| 2003/0033351 A1 | 2/2003 | Ricciardi | |
| 2003/0076959 A1 * | 4/2003 | Chui ........................... | 380/277 |
| 2004/0255048 A1 | 12/2004 | Lev Ran et al. | |
| 2009/0112789 A1 * | 4/2009 | Oliveira et al. .................. | 707/1 |

(Continued)

OTHER PUBLICATIONS

Hildrum, et al, "Distributed Object Location in a Dynamic Network", ACM, 2002, pp. 41-52.

*Primary Examiner*—Christopher A Revak
(74) *Attorney, Agent, or Firm*—Lee & Hayes, PLLC (57) ABSTRACT

Scalable leases reduce latency and reduce the burden on a server in managing data leases. Instead of processing individual lease requests for clients seeking access to the same data, scalable leases provide for blanket leases that all of the clients can use to access the selected data. Leases may be encrypted or selectively distributed to restrict access to the data. Moreover, distributed data structures may be used to cache leases at identifiable nodes in a network to offload work from the server without all clients in the network having to cache all blanket leases issued. Thresholds for issuing blanket leases may be determined or adjusted by considerations such as demand for the selected data and server workload. Similarly, leases may be renewed on the basis of demand for selected data, conflicting lease requests, and other factors. Scalable leases may be issued for read leases and controlled write leases.

20 Claims, 9 Drawing Sheets

U.S. PATENT DOCUMENTS

2009/0112811 A1* 4/2009 Oliveira et al. ................. 707/3
2009/0112879 A1* 4/2009 Oliveira et al. ................ 707/10
2009/0112880 A1* 4/2009 Oliveira et al. ................ 707/10
2009/0112921 A1* 4/2009 Oliveira et al. .......... 707/103 R

* cited by examiner

SCALABLE LEASES

BACKGROUND

In maintaining and controlling access to data, a pivotal concern is data integrity. In networked systems, many users and applications may concurrently seek to access the same data. Even in a standalone system, multiple applications may concurrently attempt to read data from or write data to the same address, possibly with multiple processing threads of multiple applications representing clients that contend with one other to access data. Because it is difficult to foresee, let alone avoid, the myriad situations in which multiple clients may seek conflicting access to data, it is important to control access to the data to ensure that one client does not contemporaneously overwrite data on which another client currently relies.

One way to preserve data integrity is to place a lock on selected data. When the selected data is locked for exclusive access, other clients may not read or overwrite the selected data until a client having the lock releases the data to other clients. The client having the lock can rely on the selected data not being changed by other clients until the client releases the lock. Similarly, because other clients cannot access the selected data until the lock is removed, the lock prevents the other clients from performing operations based on outdated values of the selected data.

One form of lock is a lease. A lease places a lock on selected data until a specified expiration time is reached. The specified expiration time ensures that the selected data will not be locked indefinitely even if contact with a client is lost, as a result of a software, network, or hardware failure, or if the client merely fail to return the lease.

For example, a read lease provides selected data to a client with the assurance that the value of the selected data will not change until the client returns the lease or the expiration time is reached. Other clients may be provided with concurrent read leases to the selected data, and these other read leases may specify a later or earlier expiration time. Concurrent read leases do not conflict with one another because the operation of reading data is commutative: The order in which concurrent reads are executed has no effect on the result of the read operations. If subsequently issued read leases specify a later expiration time, they only serve to extend the time through which the values of the selected data will not change. Correspondingly, a write lease allows a client to overwrite the selected data up to the specified expiration time. Write leases conflict with other write leases or read leases because the write operation is not commutative either with other write operations or with read operations: the order in which the operations are executed may affect the result of the operations. To prevent conflicting access to the selected data, no write leases may be issued until all read leases or other write leases on the selected data have been returned or have expired.

Leases may result in latency. For example, there may be significant delays when a number of clients seek conflicting leases for the same selected data. A server can seek to recall a lease when other lease requests are pending, but the server cannot grant other leases until the client returns the lease or the lease expires. In the case of concurrent read leases, the server may have to wait for numerous clients to return their leases before issuing a conflicting write lease. In addition, when a server must respond to lease requests, lease returns, acknowledgement of recall requests, and other messages, processing all these messages alone may overwhelm the server, making it difficult for the server to effectively manage lease requests.

SUMMARY

Scalable leases reduce latency and reduce the burden on a server in managing data leases. Instead of processing individual lease requests for clients seeking access to the same data, scalable leases provide for blanket leases that all of the clients can use to access the selected data. Leases may be encrypted or selectively distributed to restrict access to the data. Moreover, distributed data structures may be used to cache leases at identifiable nodes in a network to offload work from the server without all clients in the network having to cache all blanket leases issued. Thresholds for issuing blanket leases may be determined or adjusted by considerations such as demand for the selected data and server workload. Similarly, leases may be renewed on the basis of demand for selected data, conflicting lease requests, and other factors. Scalable leases may be issued for read leases and controlled write leases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

DETAILED DESCRIPTION

Overview

The term "scalable leases" describes embodiments of methods and systems for providing efficient access to commonly sought data. When a client seeks selected data, it sends a lease request to the server. The server will determine whether it is able to issue the lease, and issues a lease to the client for the selected data. Upon receiving repeated requests for the same selected data, instead of continuing to send out individual leases, the server issues a blanket lease, which grants multiple clients access to the data. The issuance of the blanket lease reduces server workload in processing multiple leases for the same data. The issuance of the blanket lease also reduces latency. Latency is reduced not only because the server may face a reduced workload, but also because clients seeking the selected data may find a blanket lease already has been issued, allowing immediate access to the data.

In various modes of scalable leasing, blanket leases can be encrypted or distributed via a secured channel such that only authorized clients can use the blanket lease to access the data. To further reduce server workload, leases may be multicast using a multicast tree. Also, using techniques such as distributed hash tables, caretaker nodes in the network may cache a designated portion of the blanket leases. Thus, clients need not cache all the blanket leases issued by the server. A client seeking a particular lease can consult with the appropriate caretaker node to determine if a suitable blanket lease is available before sending a lease request to a server, potentially reducing latency while reducing server workload.

Scalable leases are suitable both for read leases to the selected data, as well as multiple-client, controlled write leases, such as black-box leases.

Server Issuance of Blanket Leases

Figure 1:
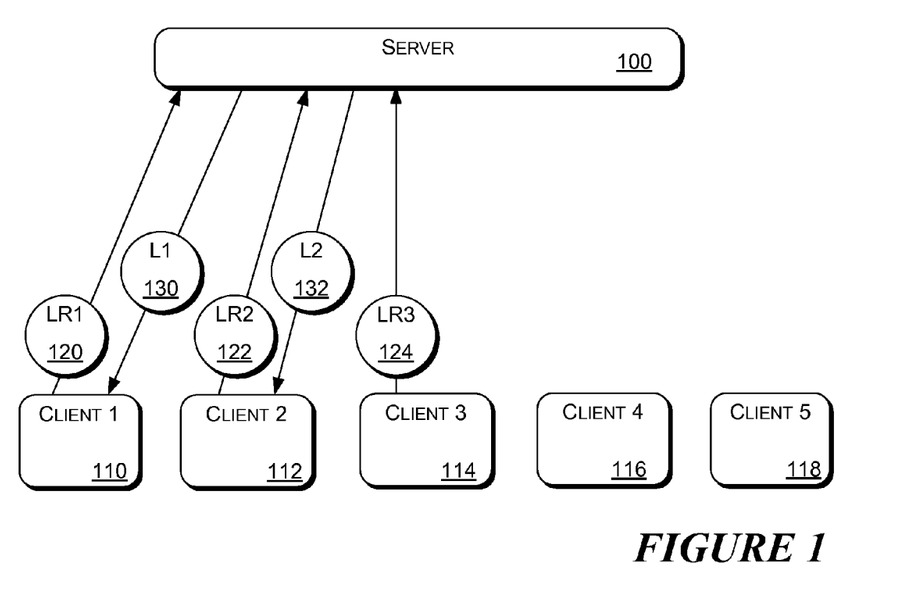
FIGS. 1-2 illustrate a network in which a server issues a blanket lease after receiving a number of lease requests.

FIG. 1 illustrates a network in which a server 100 manages data used by a plurality of clients 110-118. For example, Client 1 110 requires read access to selected data and thus issues a first lease request LR1 120 to the server 100. When the server 100 determines there are no outstanding, conflicting leases, such as an outstanding write lease for the selected data, the server 100 issues a lease L1 130 to Client 1 110 to use the selected data until a specified expiration time. Note that, for this example and other examples except when otherwise noted, it is assumed that all the lease requests are for read leases. Also, it is assumed in these examples that the clients seek access to, at least in part, the same data.

Client 2 112 subsequently identifies a need to access the selected data, and sends a second lease request LR2 122 to the server 100. LR2 122 is the second request received by the server 100, and thus is termed the second lease request. Again, the server 100 issues a read lease L2 132 to Client 2 112. Because L2 132 is issued after L1 130, L2 132 may have a later expiration time than that of L1 130. Nonetheless, both Client 1 110 and Client 2 112 can access the selected data during the overlapping term of their leases.

Client 3 114 then sends a third lease request, LR3 124, to the server 100 seeking access to the same, selected data. The server 100 could continue to issue individual leases to clients. However, upon identifying that many clients seek nonconflicting access to the same selected data, the server 100 may employ a mode of scalable leases to potentially anticipate subsequent requests, thereby reducing latency for clients seeking the data and also reducing server workload.

Figure 2:
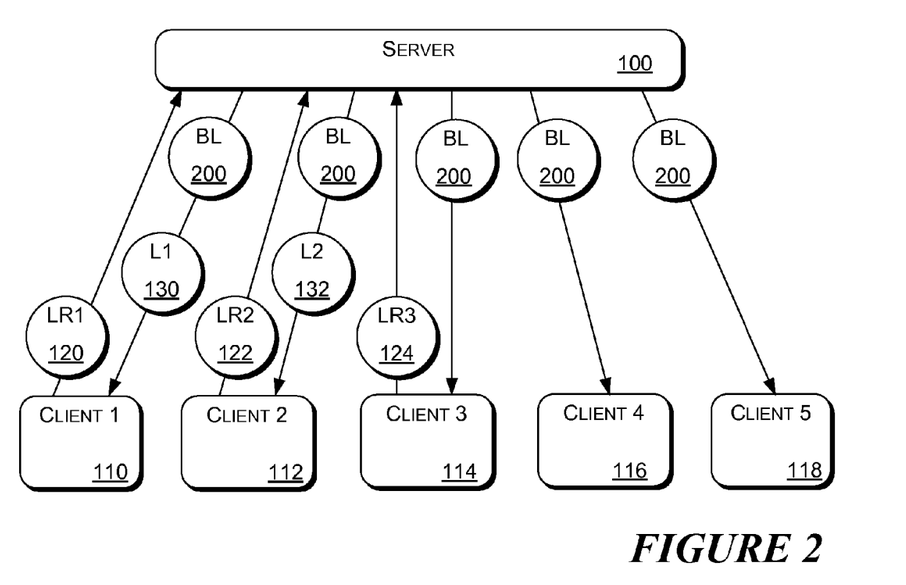

FIG. 2 illustrates the server 100, after having received the third lease request LR3 124 broadcasting a blanket lease BL 200 to all the clients in the network. In this example, the server 100 issues a blanket lease upon reaching a threshold of three lease requests for the same data. Blanket lease BL 200 allows each of the clients in the network, whether the client already holds a lease for the selected data or not, to read the selected data. In one mode, the clients each will cache any blanket leases issued by the server 100, so that if any clients subsequently identify a need for the data covered by the blanket lease, the clients immediately will have a lease to access the data.

If the blanket lease BL 200 specifies a later expiration time than previously issued individual leases, such as L1 130 and L2 132, the blanket lease BL 200 effectively extends the previously issued leases for the clients holding them. Thus, issuance of the blanket lease BL 200 not only avoids the possibility of Client 4 116 and Client 5 118 having to make their own lease requests and for the server 100 to have to process the requests, but the issuance of the blanket lease BL 200 also may forestall clients holding individual leases, such as Client 1 110 and Client 2 112, from having to request renewal of their leases. Thus, a mode of scalable leases may reduce latency in data access, as well as server workload. Accordingly, scalable leases may allow a server to effectively support more clients without adding additional, duplicative servers, without having to synchronize those servers, and without having to confront the costs and problems associated with maintaining additional servers.

Figure 3:
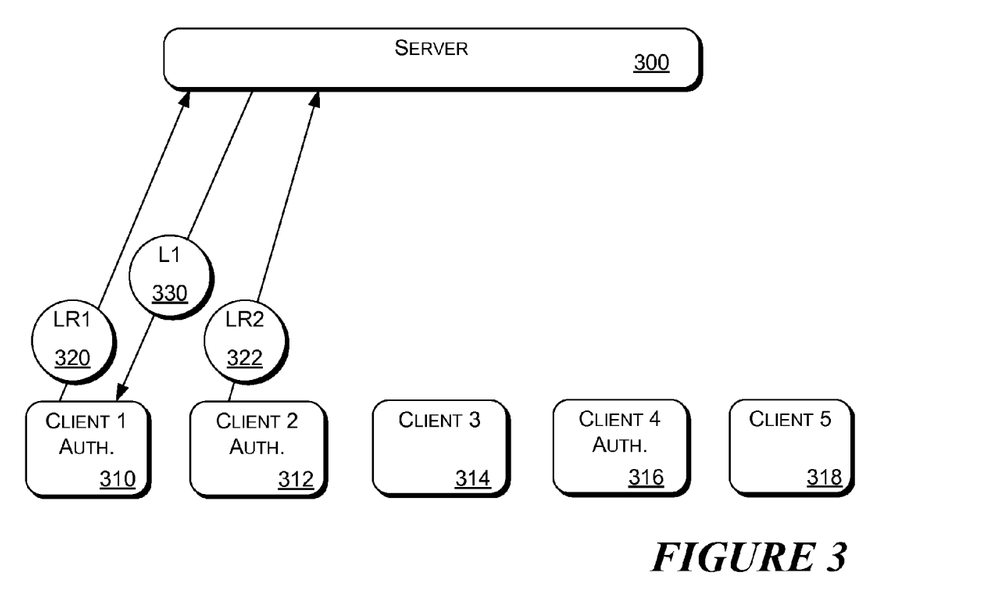
FIGS. 3-4 illustrate a network in which a server issues an encrypted blanket lease accessible only to clients authorized to access the data.
Figure 4:
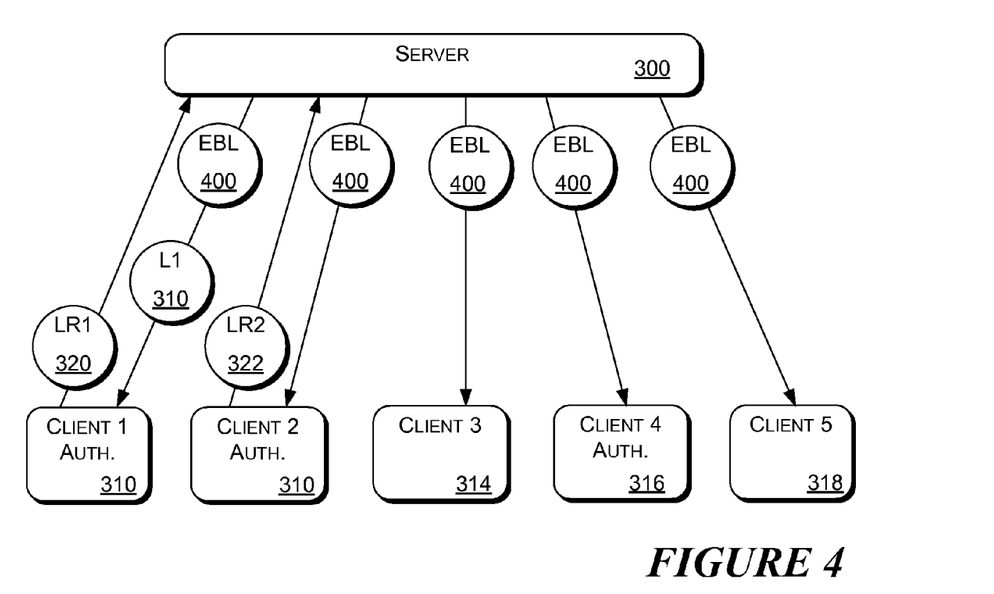

FIGS. 3 and 4 illustrate another mode of issuing blanket leases when not all clients in the network are authorized to access data that might be the subject of a blanket lease. As in the case of FIG. 1, FIG. 3 illustrates a server 300 that serves a number of clients 310-318. In the example of FIG. 3, it is assumed that Client 1 310, Client 2 312, and Client 4 316 each are authorized to access selected data that will be distributed using a blanket lease. However, Client 3 314 and Client 5 318 are not authorized to access the selected data.

As FIG. 3 illustrates, Client 1 310 identifies a need to access the selected data for which Client 1 310, Client 2 312, and Client 4 316 have access authorization, as previously described. Client 1 310 sends a first lease request 320 to the server 300, and the server 300 issues a lease L1 330 to Client 1 310. The server 300 may encrypt the lease so that no unauthorized clients may intercept the data values represented in the lease, or lease L1 330 may be transmitted using a secure channel so that only Client 1 310 will be able to access the data values represented in the lease L1 330. Subsequently, Client 2 312 also identifies a need to access the same selected data, and sends a second lease request LR2 322 to the server.

FIG. 4 illustrates the server 300 broadcasting an encrypted blanket lease EBL 400 to all the clients in the network. There are three points to note about the transmission of the encrypted blanket lease EBL 400 in FIG. 4. First, access to the encrypted blanket lease EBL 400 may be secured by an encryption technology that may be unlocked by a key that previously has been distributed to authorized clients, such as Client 1 310, Client 2 312, and Client 4 316. Thus, upon receiving the encrypted blanket lease EBL 400, each of the authorized clients will cache the encrypted blanket lease EBL 400 for possible later use. If Client 1 310 determines that it needs access to the selected data beyond the expiration time of the individual lease L1 330 it already has received, Client 1 310 can use its key to decrypt the encrypted blanket lease EBL 400. If the expiration time specified by the encrypted blanket lease 400 provides sufficient additional access time, Client 1 310 may forestall the process of renewing its lease. Similarly, if Client 4 316 determined before the expiration time of the encrypted blanket lease EBL 400 that it needed to access the selected data, Client 4 316 would have immediate access to the data without having to request or obtain an individual lease.

Second, although the encrypted blanket lease EBL 400 is sent to clients that are not authorized to access the selected data covered by the lease, unauthorized clients will not be able to access the selected data. Because Client 3 314 and Client 5 318 are not authorized to access the selected data, they will not have the key needed to decrypt the encrypted blanket lease 400. Thus, even though unauthorized clients may receive encrypted blanket leases, unauthorized clients cannot access the contents of the encrypted blanket leases. In one mode, when a client receives and caches an encrypted blanket lease it is not authorized to access, the client may release the memory or storage space in which the encrypted blanket lease is cached to avoid wasting memory or storage for leases the client cannot use.

Third, in contrast to the example of FIGS. 1 and 2, where the server 100 issued a blanket lease after receiving three requests for the same data, in FIGS. 3 and 4, the server issued a blanket request after only two such requests. Thresholds for the issuance of blanket leases may be predetermined and/or dynamically adjusted according to a number of factors. For example, if the selected data is known to be used by many clients, the server may recognize a lower threshold for the issuance of blanket leases for this data. In other words, if the server expects that it is going to receive numerous requests for particular data, the server may issue the blanket lease after receiving a few requests to provide clients with ready access to the data and to save work for itself. The server also may renew such leases to avoid latency and reduce server workload, as described below with reference to FIG. 11.

Other factors also may be considered in determining the threshold for the issuance of a blanket lease. For example, because blanket leases reduce server workload, if a server is expected to or becomes busy, the threshold may be lowered to seek to reduce overhead from possibly having to process numerous, duplicative requests. Also, when a server is asked for multiple individual encrypted leases, to avoid the processing time involved in encrypting the individual leases, the server may issue an encrypted blanket lease at a lower threshold. These factors are exemplary, and do not represent an exhaustive list of the considerations for determining a threshold for the issuance of blanket leases.

Figure 5:
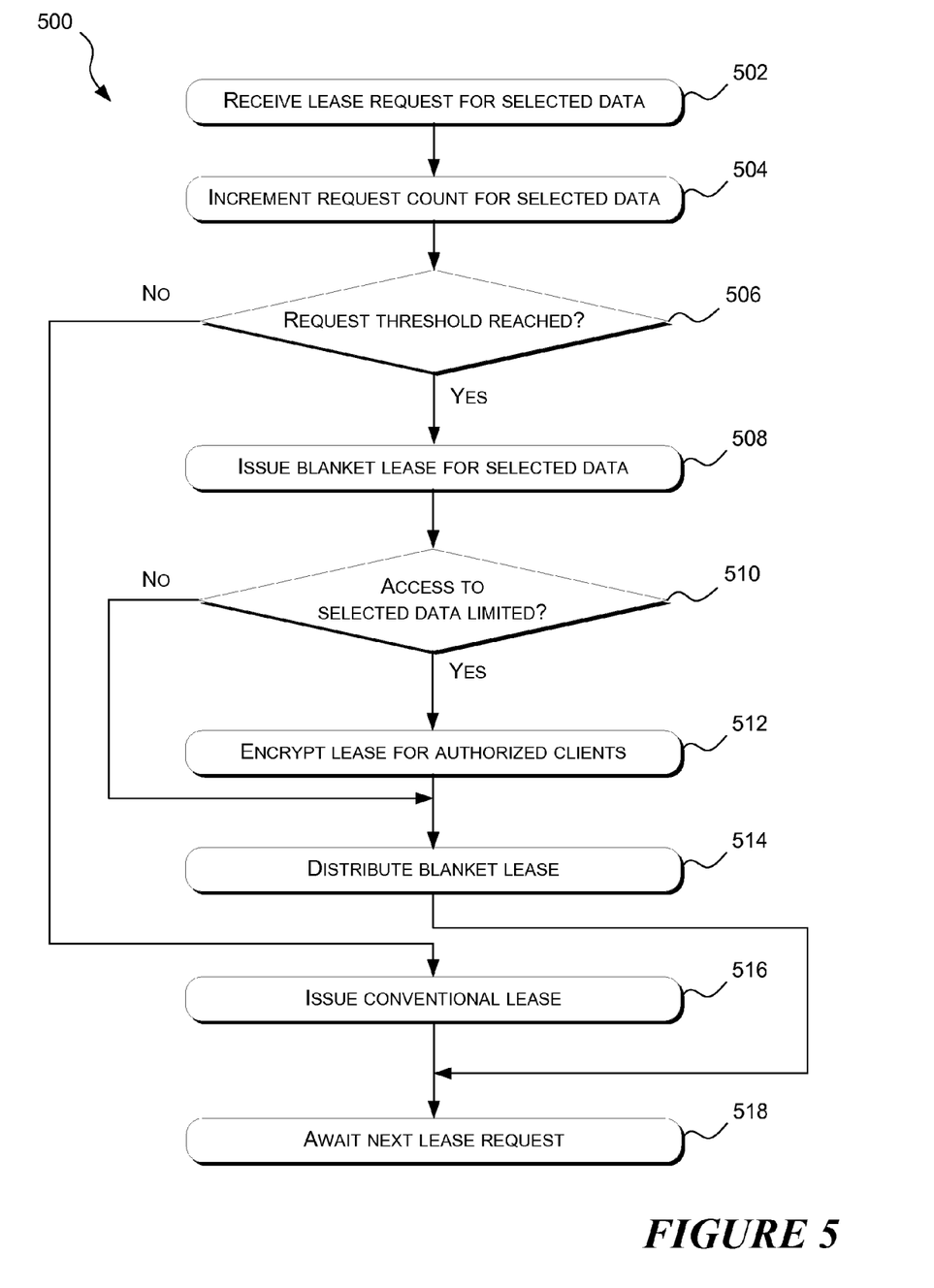
FIG. 5 illustrates a mode a server uses to manage scalable leases.

FIG. 5 is a flow diagram 500 illustrating a mode a server may use to manage scalable leases, such as blanket leases. The flow diagram 500 begins with block 502, when the server receives a lease request for selected data. For purposes of the flow diagram 500, as in the foregoing examples of FIGS. 1-4, it is assumed that the lease requests are for non-conflicting access to the same data. Lease requests for different, nonoverlapping data are treated separately.

Block 504 increments a request count for leases to the selected data. Block 506 checks the request count for the selected data and determines if a request threshold has been reached that would indicate that a blanket lease should be issued.

There are four aspects to note about the issuance of blanket leases based on a threshold. First, as previously described, the server also may check server workload and other factors to adjust the threshold. Second, the request count may represent a number of unexpired leases outstanding for the selected data, or may represent a number of requests over a longer or shorter period of time. The request count may track requests over a longer period as a general indication that the selected data may be in demand. Thus, the server may issue blanket leases based not only on the number of outstanding leases, but also on the continuing demand for the selected data. In this case, the threshold may be adjusted accordingly.

Third, in one mode, the threshold may be set to one, such that a server issues a blanket lease in response to every lease request. Such an implementation would reduce server workload. However, because of the resources used in broadcasting and caching the lease, and because it may prove unworkable to recall a blanket lease, using a threshold of one desirably may be limited to data for which the server acknowledges that a first request is an indication that many requests for the same data will immediately follow.

Fourth, the threshold may also be a function of the expiration time to be associated with a blanket lease. For example, if the selected data is such that clients that need the data will not need it for long and the blanket lease may be subject to a short expiration time, a lower threshold may be suitable. Recalling a blanket lease may be practically impossible, because recalling such a lease would require all clients to acknowledge the recall request. Both the threshold and expiration time itself may be selected based on the number of clients in the system and how long it might take to recall a blanket lease to determine practical figures to use in managing scalable leases.

Referring again to FIG. 5, when block 506 determines the request threshold has been reached, block 508 issues the blanket lease for the selected data. Block 510 determines whether access to the selected data is limited. If access is limited, block 512 encrypts the lease so that only authorized users can access the lease. Whether block 510 determined that the selected data does not limit access or once block 512 encrypts the lease, block 514 distributes the blanket lease. In the foregoing examples of FIGS. 2 and 4, the server broadcasts the blanket lease to all clients. Additional distribution schemes are addressed in the next section of this paper.

On the other hand, if block 506 determines that the request threshold has not been reached, block 516 issues a conventional lease to the requesting client. Whether a blanket lease has been distributed by block 514, or a conventional lease has been issued by block 516, the flow diagram 500 ends with block 518 awaiting a next lease request.

Distribution of Blanket Leases

As FIGS. 2 and 4 illustrate, one manner of distributing blanket leases involves broadcasting the blanket leases to every client in the network. In a large network, however, tasking the server with broadcasting leases to all clients in the network may be a wasteful use of server and network resources. In addition, tasking every client with storing all issued blanket leases may be a wasteful use of client resources.

Figure 6:
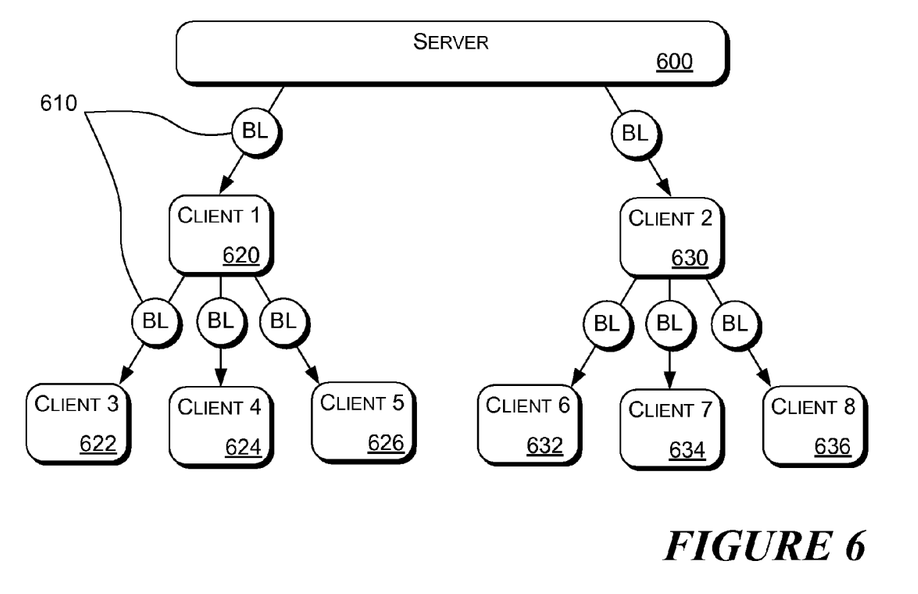
FIG. 6 illustrates a server distributing a lease using a multicast tree.

FIG. 6 illustrates a server 600 configured to distribute blanket leases using a multicast tree. Upon issuing a blanket lease BL 610, instead of directly broadcasting the blanket lease to every client in the network, the server 600 sends the blanket lease only to a few intermediate clients, including Client 1 620 and Client 2 630. Client 1 620 then distributes the blanket lease BL 610 to a group of clients including Client 3 622, Client 4 624, and Client 5 626. Client 2 630 distributes the blanket lease BL 610 to a group of clients including Client 6 632, Client 7 634, and Client 8 638. In a larger network, Clients 3 622, Client 4 624, Client 5 626, Client 6 632, Client 7 634, and Client 8 638, then would distribute the blanket lease 610 to other clients. Ultimately, the blanket lease BL 610 is distributed throughout the network. Multicasting, such as by using the multicast tree illustrated in FIG. 6, thus reduces server overhead by distributing the task over a number of clients. FIG. 6 illustrates multicasting by use of an application-level multicast tree that employs clients as multicast tree nodes, other forms of multicast, such as the use of network-level multicast groups, are also suitable.

Figure 7:
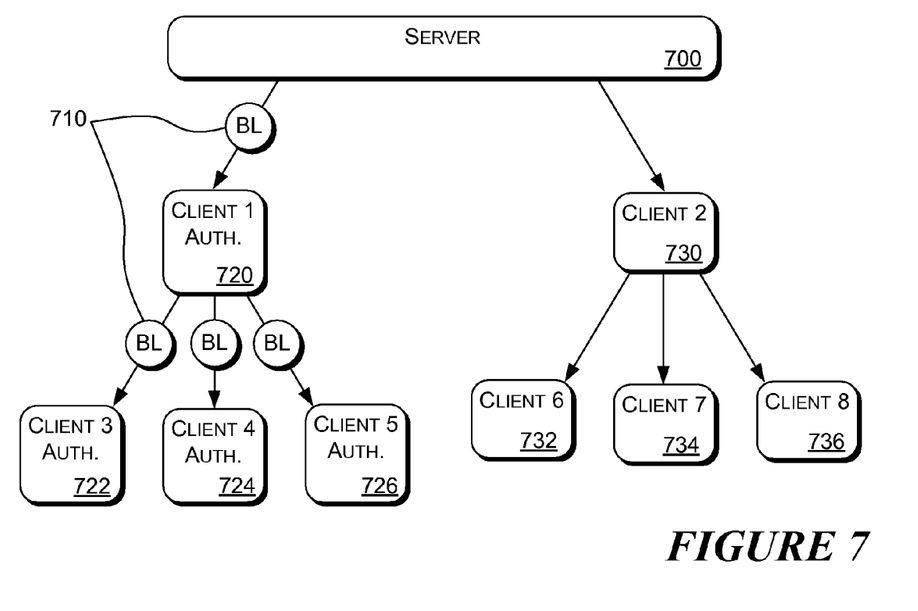
FIG. 7 illustrates a server distributing a lease using selective multicasting.

FIG. 7 illustrates a server 700 configured to distribute blanket leases using selective multicasting. Upon issuing a blanket lease BL 710 that is intended only for a subset of clients authorized to access the selected data, the server 700 directs the blanket lease 710 to Client 1 720, which in turn directs the blanket lease 710 to Client 3 722, Client 4 724, and Client 5 726. Client 1 720, Client 3 722, Client 4 724, and Client 5 726 are authorized to access the selected data, thus only these clients will receive the blanket lease 710. On the other hand, the server 700 does not distribute the blanket lease 710 to Client 2 730 and a group of clients it serves including Client 6 732, Client 7 734, and Client 8 736. Thus, selective multicasting saves server overhead in the server not having to broadcast or encrypt the leases, but while still limiting access to authorized users. Selective multicasting also saves client overhead by arranging that clients that cannot use a given lease do not participate in multicasting that lease. Selective multicasting may be implemented in a network transport layer or other layers to create separate logical multi-cast trees to restrict what clients actually may receive and cache such leases.

Figure 8:
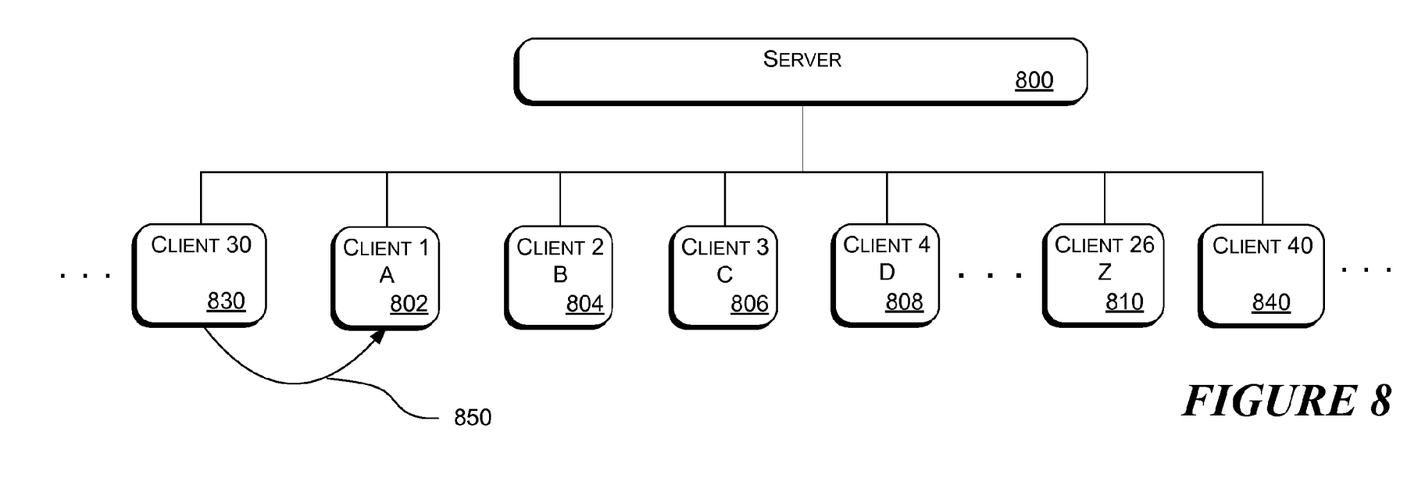
FIGS. 8-9 illustrate the use of caretaking nodes that cache a portion of the blanket leases issued by a server.
Figure 9:
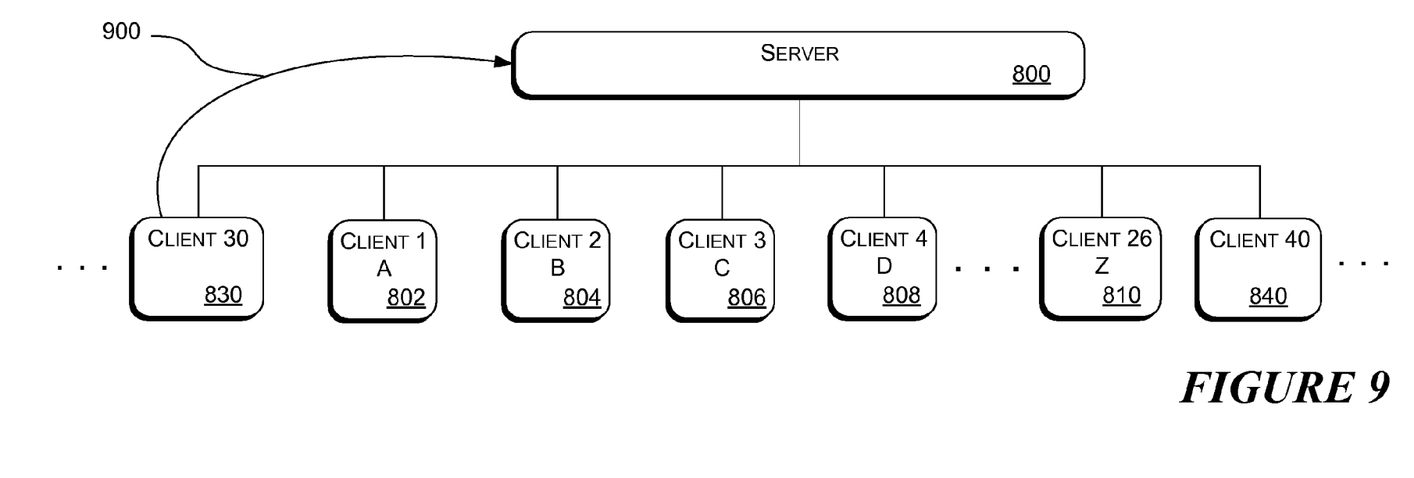

FIGS. 8 and 9 illustrate a process for using intermediate, "caretaker" clients to assist in the distribution of scalable leases. FIG. 8 illustrates a server 800 in communication with a number of clients over a network. The clients include a number of caretaker clients, including Client 1 802 through Client 26 810. In one exemplary mode of scalable leases, the data are stored in named files that begin with the letters A through Z.

As previously described, in one mode of scalable leases, blanket leases are cached by all clients for possible later use. However, particularly in a large or busy network, there may be a great number of blanket leases issued to clients. Having all of the clients cache all of the blanket leases may prove burdensome. On the other hand, if the blanket leases are not cached, many of the advantages of scalable leases are reduced or lost. Thus, in one mode, a number of caretaker clients are designated to cache a designated portion of the blanket leases issued by the server 800. Thus, in the example of FIG. 8, Client 1 802 caches blanket leases to files whose filenames begin with the letter A. Similarly, Client 2 804 caches blanket leases to files whose filenames begin with the letter B, Client 3 806 caches blanket leases to files whose filenames begin with the letter C, Client 4 808 caches blanket leases to files whose filenames begin with the letter D, through Client 26 810 that caches blanket leases to files whose filenames begin with the letter Z. Again, this assignment of responsibilities illustrates just one example. By way of further illustration, apportionment of caching responsibilities could be based on other information associated with files or other collections of data that clients may need to access.

In the example of FIG. 8, other clients in the network, such as Client 30 830 or Client 40 840, may identify a need to access selected data. Client 30 830 may determine that it needs to access a file named "APPLE." Because "APPLE" begins with the letter A, if a current blanket lease has been issued for the file APPLE, Client 1 802 would be responsible for caching such a blanket lease. Thus, Client 30 830 sends a lease request or query 850 to Client 1 802 to determine if a suitable blanket lease has been issued that Client 30 830 could use to access the data it needs. If Client 1 802 has cached a blanket lease for the selected data that Client 30 830 needs, Client 1 802 can send the lease to Client 30 830.

If Client 1 802 has not cached an unexpired blanket lease that Client 30 830 can use to access the selected data, FIG. 9 illustrates that Client 30 830 then may issue a request to the server 800 for a lease on the selected data. As previously described, based on demand for the selected data, the server 800 may issue an individual lease to Client 30 830 to access the data, or the server 800 may issue a blanket lease that Client 1 802 would cache for all clients seeking the same selected data. The server 800 both may issue both a blanket lease and an individual lease to Client 30 830 to directly address the client's request, or the server 800 may issue a blanket lease and send a copy of it to Client 30 830 or otherwise notify Client 30 830 that a blanket lease is available from the appropriate caretaker client. Alternatively, upon finding that no suitable lease is cached on Client 1 802, Client 30 830 may send the lease request and, if no individual lease is received, Client 30 830 may check back with Client 1 802 after allowing the server 800 to issue a suitable blanket lease.

The use of caretaker clients presents at least two advantages. First, clients in the network may access previously issued blanket leases without having to cache all the blanket leases issued by the server. Second, if the appropriate caretaker client has cached a lease that meets a client's needs, that client need not send a lease request to the server. As a result, server workload is reduced, and the client also is likely to be able to access the selected data in less time than the server could provide a lease. Thus, caretaker nodes eliminate the need for all clients to cache leases, while reducing server overhead and latency.

A system including caretaker clients may be implemented using a number of different distributed data structures. For example, a distributed hash table, a distributed skip net, or a distributed B-tree, as well as other distributed data structures could be used to facilitate a system where identifiable caretaker clients each cache a subset of the blanket leases issued by a server.

Figure 10:
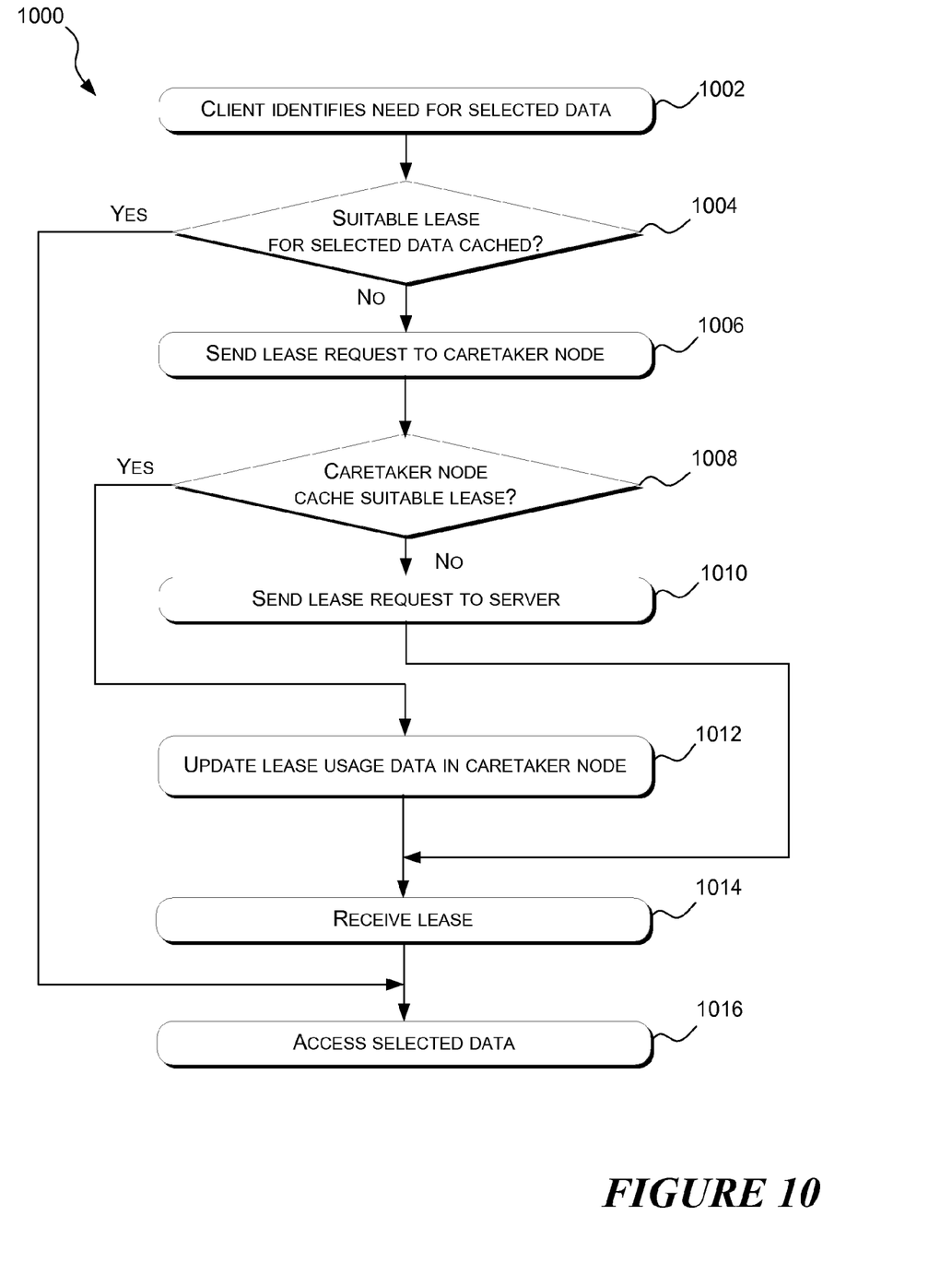
FIG. 10 illustrates a mode a client uses to seek a blanket lease.

FIG. 10 is a flow diagram 1000 illustrating a process by which a client may seek access to selected data. The flow diagram 1000 begins when block 1002 identifies that the client needs to access selected data. Block 1004 determines whether a suitable lease for the selected data already is cached on the client. The client may cache some blanket leases issued by a server or a lease (blanket or individual) already may have been received for another application or processing thread executing on the client system. If a suitable lease is already available on the client system, the flow diagram 1000 advances to block 1016 where the selected data is accessed by the client.

On the other hand, if block 1004 determines that no suitable lease is cached on the local system, block 1006 sends a lease request to a caretaker client or other caretaker node in the system where such a blanket lease for the selected data would be stored. Block 1008 determines whether the caretaker node has cached a suitable lease for the selected data. If not, block 1010 sends a lease request to the server to obtain a lease for the selected data. The request may be generated by the client seeking access to the data, as shown in FIG. 9, or the caretaker node may generate the request.

However, if block 1008 determines the caretaker node has cached a suitable lease, in one mode, block 1012 updates lease usage data maintained by the caretaker node, as further described with reference to FIG. 11. Once block 1012 updates the lease usage data, or block 1010 has requested a lease from the server, block 1014 receives the leases for the client to use. As previously described with reference to FIGS. 8 and 9, the client may receive an individual lease or may receive a blanket lease in a number of ways. Once the client receives the lease, block 1016 allows the client to access the data.

Renewal of Scalable Leases

As previously mentioned, a server may consider many factors, including demand for selected data, server workload, and other factors, in determining when to issue or renew blanket leases. Similarly, a server may renew leases based on similar factors to reduce latency or reduce server overhead.

Figure 11:
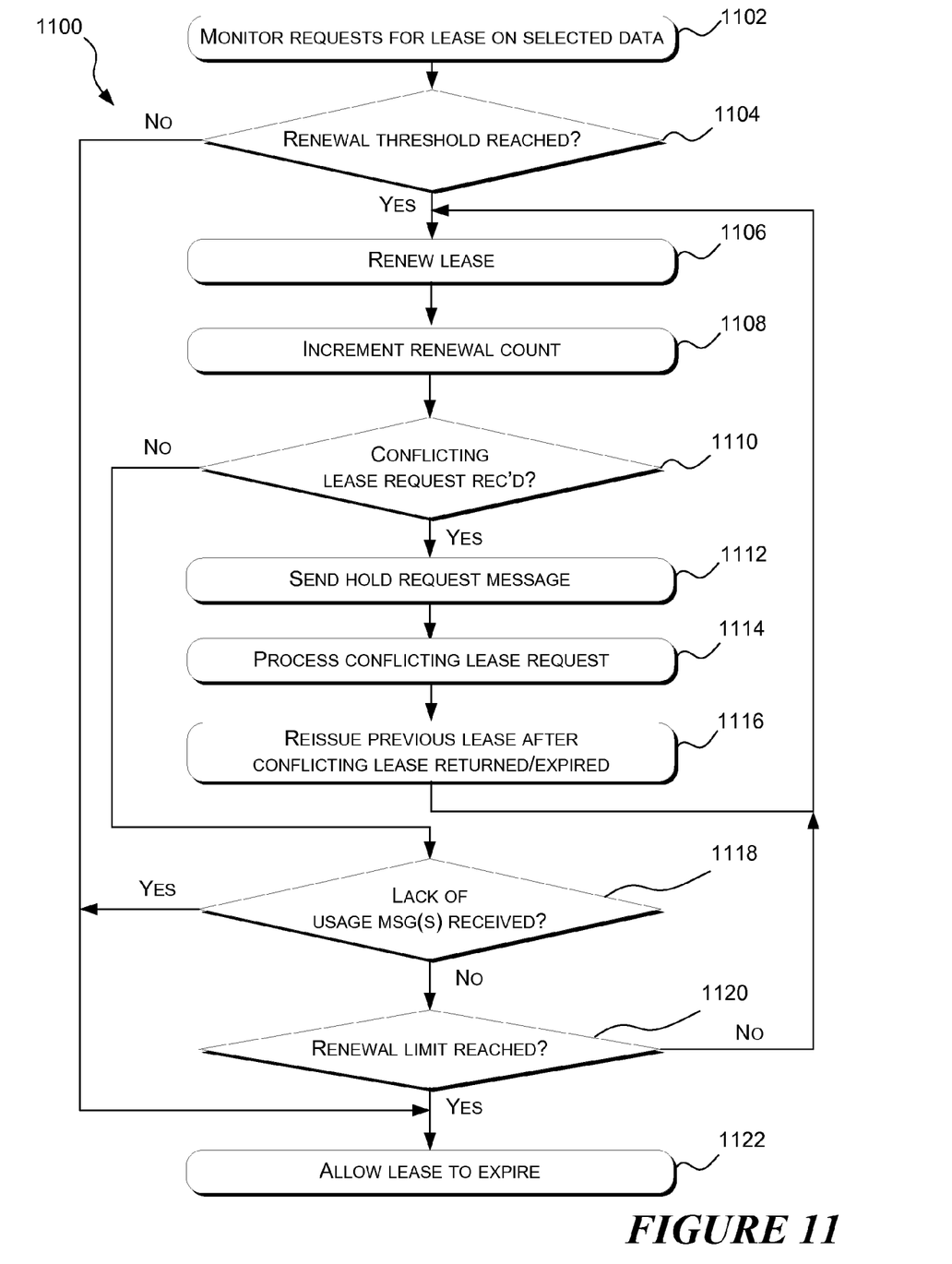
FIG. 11 illustrates a mode a server uses to determine whether to renew blanket leases.

FIG. 11 illustrates a flow diagram 1100 of one mode a server may use to make and adjust determinations of when to renew leases. Block 1102 monitors requests the server receives for leases on selected data. The server may monitor a number of current requests, a number of historical requests, or other factors comparable to those described with regard to determining a lease issuance threshold with regard to FIG. 5. Relative to such request tracking data, block 1104 determines when a renewal threshold is reached. A renewal threshold may specify that a lease will be renewed a certain number of times when the number of requests for a lease on the data reached a total indicating that, if the lease is not renewed, the server will confront numerous lease requests for the same data. A number of renewals may be limited to ensure that the server is not wastefully processing renewals when demand for the selected data may have dropped. Block 1106 renews the lease, and block 1108 increments the renewal count if the server limits the number of consecutive renewals.

Block 1110 determines whether a conflicting lease request has been received. For example, after the server renews a blanket read lease, a client may submit a request for a write lease. Because the server cannot issue a write lease when a read lease is outstanding, the server must eventually stop renewing the blanket read lease, or else it will never be able to issue the requested write lease.

If the server does not renew a blanket lease, the server may confront numerous new requests for a read lease. To avoid the server workload that would result upon receiving such numerous requests, block 1112 issues a hold request message. The hold request message informs clients that want access to the selected data that the blanket lease will not be renewed while a conflicting lease request is processed. The hold request message may inform the clients that the lease will not be renewed immediately, but will be renewed after the write lease is returned or expires. Thus, if the clients seeking access to the data are informed a new blanket lease will issue, the clients need not send the lease requests, and neither caretaker nodes nor the server need process such requests. Block 1114 processes the conflicting lease request. Once the conflicting lease is returned or expires, block 1116 reissues the previous lease as was promised in the hold request message. The flow diagram 1100 then loops to block 1106 to continue renewing the lease, subject to other limitations described below.

If block 1110 detects no conflicting lease request, the flow diagram 1100 advances to block 1118 to determine if the server has experienced a lack of requests for the lease. In one mode, for example, caretaker nodes may track lease requests they receive from other clients. If requests for a blanket lease drop below a certain level, the caretaker node may inform the server that the lease need not be renewed. If block 1118 detects no such message has been received, block 1120 determines if the renewal limit has been reached. As previously described, rather than renewing leases perpetually, periodically the server may avoid renewing a blanket lease so as to evaluate the current demand for the covered data manifested by the ensuing lease requests.

When block 1104 determines that the renewal threshold has not been met, block 1118 determines that a lack of request message has been received, or block 1120 determines that a renewal limit has been reached, block 1122 allows the blanket lease to expire.

Scalable Write Leases

Conventional write leases may be issued only to a single user, because general write operations on a single datum are not commutative. Scalable leases lend themselves naturally to read leases because read operations are commutative. However, scalable leases are not limited to read leases alone. Multiple-client write leases may be issued for specialized data types whose write operations are commutative in some circumstances.

One example of such a data type is incorporated in a black-box lease as described in U.S. patent application Ser. No. 11/015,227 filed on Dec. 17, 2005, for a "Method and System for Protecting the Consistency of Information in a Distributed File System." Applicants incorporate by reference the invention disclosed in this document as an example of a multiple-client write lease suitable for use with modes of scalable leasing. The black-box lease is a form or a controlled write lease that allows one of the clients with access to the lease to write data only when writing data will not conflict with other clients' usage of the lease.

Figure 12:
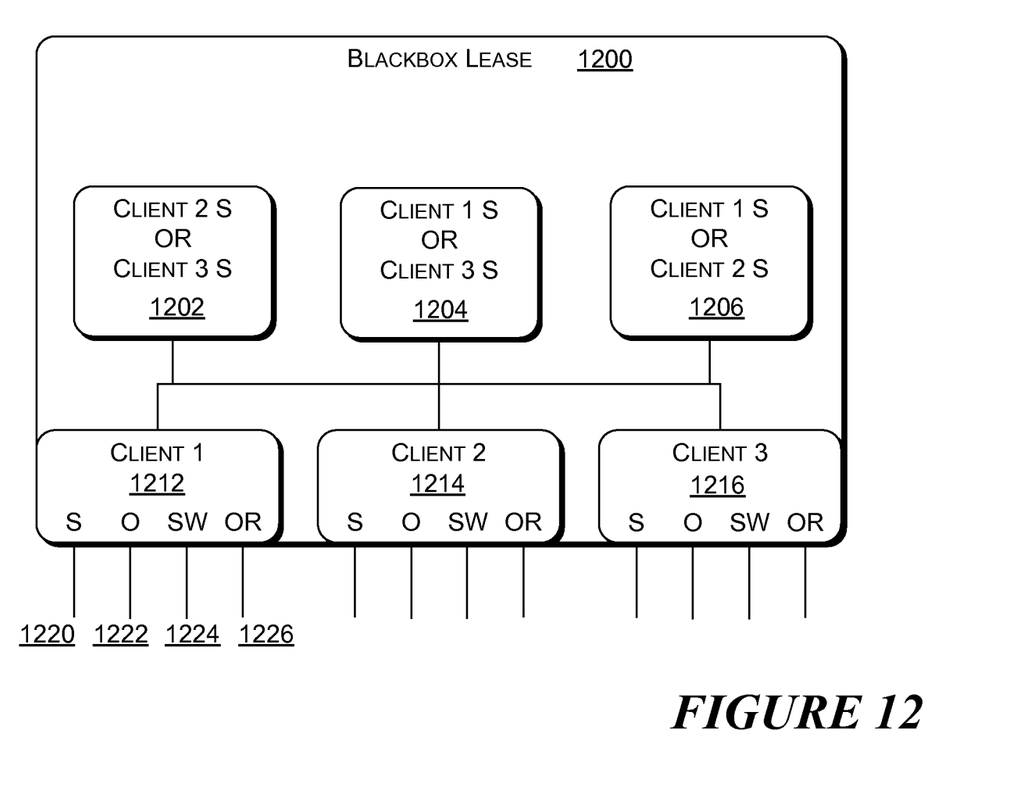
FIG. 12 illustrates an exemplary multiple-user write lease usable with modes of scalable leases.

Although incorporated by reference, FIG. 12 illustrates a black-box lease 1200 to illustrate a write lease suitable for use with scalable leases. The black-box lease 1200 includes status bits for each of a plurality of clients to which the black-box lease is issued to determine which of the clients can write data using the lease. More specifically, for each client, the black-box includes a data and control access. FIG. 12 illustrates a black-box lease for three clients, and there is a data and control access 1212 for Client 1, a data and control access 1214 for Client 2, and a data and control access 1216 for Client 3. Each data and control access includes a self data line 1220, an other data line 1222, a self-write bit 1224, and an other-read bit 1226. The control bits are in communication with control blocks 1202-1206 that determine whether any of the clients is permitted to write data using the black-box lease 1200. In the example of FIG. 12, the value of each client's other data line 1222 is computed as a logical OR of the self data lines 1220 of all other clients. For instance, the value of the other data line 1222 of Client 1 is computed as Client 2 S OR Client 3 S by control block 1202. The control logic in the black-box lease 1200 uses the self-write bit 1224 to grant each client permission to write its self data line 1220. Similarly, the control logic uses the other-read bit 1226 to grant each client permission to read its other data line 1222. Because of the structure of the black-box lease, there are circumstances under which multiple clients may be allowed to write their self data lines concurrently. For example, if no client currently has other-read permission, then all clients may be granted self-write permission. There are other, more involved, circumstances in which multiple clients may be granted concurrent write access, as described in U.S. patent application Ser. No. 11/015,227.

Because the black-box lease 1200 determines which of multiple clients to which it is issued can read from and write to the data covered by the black-box lease, a mode of scalable leases may be used to provide a lease with write privileges to multiple clients. The black-box lease 1200 is only one example of such a lease with controlled write privileges that may be issued to multiple clients by a mode of scalable leases.

Operating Environment for Implementing Exemplary Embodiments

Figure 13:
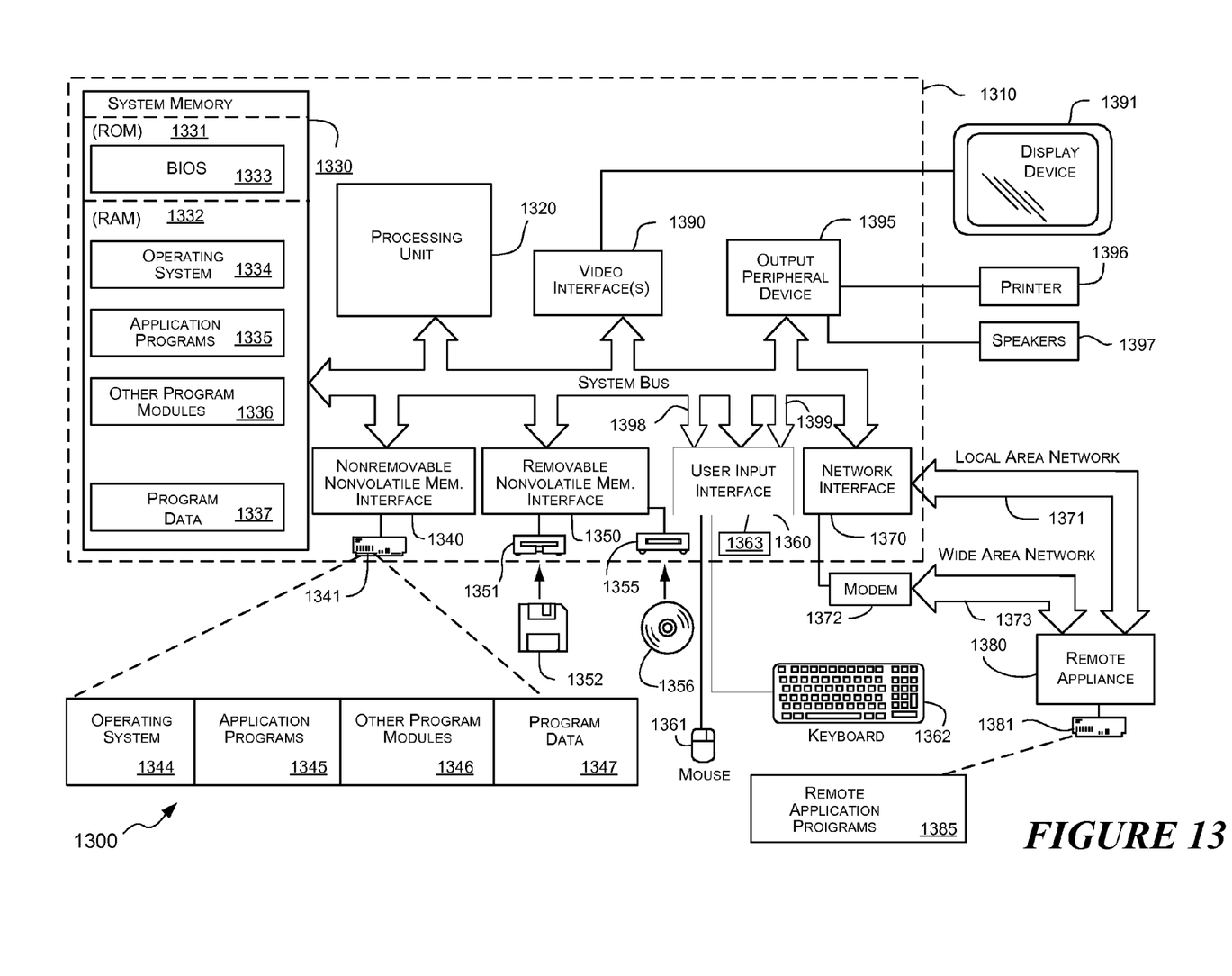
FIG. 13 illustrates an exemplary operating environment suitable for performing operations previously described.

FIG. 13 illustrates an exemplary operating environment 1300 for implementing scalable leases. The operating environment 1300 is only one example of a suitable operating environment and is not intended to suggest any limitation as to the scope of use or functionality of exemplary embodiments of scalable leases as previously described, or other embodiments. Neither should the operating environment 1300 be interpreted as having any dependency or requirement relating to any one or combination of components illustrated in the exemplary operating environment 1300.

Processes of implementing scalable leases may be described in the general context of computer-executable instructions, such as program modules, being executed in operating environment 1300. Generally, program modules include routines, programs, objects, components, data structures, etc., that perform particular tasks or implement particular abstract data types. Moreover, those skilled in the art will appreciate that processes of implementing scalable leases may be practiced with a variety of computer-system configurations, including hand-held devices, multiprocessor systems, microprocessor-based or programmable-consumer electronics, minicomputers, mainframe computers, and the like. Processes of implementing scalable leases may also be practiced in distributed-computing environments where tasks are performed by remote-processing devices that are linked through a communications network. In a distributed-computing environment, program modules may be located in both local and remote computer-storage media including memory-storage devices.

With reference to FIG. 13, an exemplary operating environment 1300 for implementing processes of scalable leases includes a computer 1310 including a processing unit 1320, a system memory 1330, and a system bus 1321 that couples various system components including the system memory 1330 to the processing unit 1320.

The computer 1310 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1310. The system memory 1330 includes computer-storage media in the form of volatile and/or nonvolatile memory such as ROM 1331 and RAM 1332. A Basic Input/Output System 1333 (BIOS), containing the basic routines that help to transfer information between elements within computer 1310 (such as during start-up) is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/nonremovable, volatile/nonvolatile computer-storage media. By way of example only, FIG. 13 illustrates a hard disk drive 1341 that reads from or writes to nonremovable, nonvolatile magnetic media, a magnetic disk drive 1351 that reads from or writes to a removable, nonvolatile magnetic disk 1352, and an optical-disc drive 1355 that reads from or writes to a removable, nonvolatile optical disc 1356 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1341 is typically connected to the system bus 1321 through a nonremovable memory interface such as interface 1340. Magnetic disk drive 1351 and optical dick drive 1355 are typically connected to the system bus 1321 by a removable memory interface, such as interface 1350.

The drives and their associated computer-storage media discussed above and illustrated in FIG. 13 provide storage of computer-readable instructions, data structures, program modules and other data for computer 1310. For example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Typically, the operating system, application programs, and the like that are stored in RAM are portions of the corresponding systems, programs, or data read from hard disk drive 1341, the portions varying in size and scope depending on the functions desired. Operating system 1344, application programs 1345, other program modules 1346, and program data 1347 are given different numbers here to illustrate that, at a minimum, they can be different copies. A user may enter commands and information into the computer 1310 through input devices such as a keyboard 1362; pointing device 1361, commonly referred to as a mouse, trackball or touch pad; a wireless-input-reception component 1363; or a wireless source such as a remote control. Other input devices (not shown) may include a microphone, joystick, game pad, satellite dish, scanner, or the like. These and other input devices are often connected to the processing unit 1320 through a user-input interface 1360 that is coupled to the system bus 1321 but may be connected by other interface and bus structures, such as a parallel port, game port, IEEE 1394 port, or a universal serial bus (USB) 1398, or infrared (IR) bus 1399. As previously mentioned, input/output functions can be facilitated in a distributed manner via a communications network.

A display device 1391 is also connected to the system bus 1321 via an interface, such as a video interface 1390. Display device 1391 can be any device to display the output of computer 1310 not limited to a monitor, an LCD screen, a TFT screen, a flat-panel display, a conventional television, or screen projector. In addition to the display device 1391, computers may also include other peripheral output devices such as speakers 1397 and printer 1396, which may be connected through an output peripheral interface 1395.

The computer 1310 will operate in a networked environment using logical connections to one or more remote computers, such as a remote computer 1380. The remote computer 1380 may be a personal computer, and typically includes many or all of the elements described above relative to the computer 1310, although only a memory storage device 1381 has been illustrated in FIG. 13. The logical connections depicted in FIG. 13 include a local-area network (LAN) 1371 and a wide-area network (WAN) 1373 but may also include other networks, such as connections to a metropolitan-area network (MAN), intranet, or the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the network interface 1370, or other appropriate mechanism. Modem 1372 could be a cable modem, DSL modem, or other broadband device. In a networked environment, program modules depicted relative to the computer 1310, or portions thereof, may be stored in the remote memory storage device. By way of example, and not limitation, FIG. 13 illustrates remote application programs 1385 as residing on memory device 1381. The network connections shown are exemplary, and other means of establishing a communications link between the computers may be used.

Although many other internal components of the computer 1310 are not shown, those of ordinary skill in the art will appreciate that such components and the interconnections are well-known. For example, including various expansion cards such as television-tuner cards and network-interface cards within a computer 1310 is conventional. Accordingly, additional details concerning the internal construction of the computer 1310 need not be disclosed in describing exemplary embodiments of processes of implementing scalable leases.

When the computer 1310 is turned on or reset, the BIOS 1333, which is stored in ROM 1331, instructs the processing unit 1320 to load the operating system, or necessary portion thereof, from the hard disk drive 1341 into the RAM 1332. Once the copied portion of the operating system, designated as operating system 1344, is loaded into RAM 1332, the processing unit 1320 executes the operating system code and causes the visual elements associated with the user interface of the operating system 1334 to be displayed on the display device 1391. Typically, when an application program 1345 is opened by a user, the program code and relevant data are read from the hard disk drive 1341 and the necessary portions are copied into RAM 1332, the copied portion represented herein by reference numeral 1335.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A computer-implemented method implemented by a computing device having a processor executing instructions stored in a computer-readable storage media, the method comprising:
  receiving, by the computing device, one or more lease requests for access to selected data, wherein the computing device manages access to the selected data based upon issuance of leases to client computers requesting to access the selected data, wherein each lease issued specifies a period of time during which a client computer has access to the data during which period of time the selected data will not be changed by another entity;
  in response to receiving a request from one of the client computers for a lease to access the selected data having access managed by the computing device, preparing a blanket scalable lease to be used by more than one client computer to concurrently access the selected data having access managed by the computing device; and
  issuing the scalable lease by the computing device to a plurality of the client computers for the plurality of client computers to use the scalable lease for accessing the selected data for the specified period of time during which the selected data is not changed.

2. A method of claim 1, further comprising:
  recognizing a request threshold representing a number of lease requests received from the client computers for accessing the selected data, wherein prior to reaching the request threshold, the computing device issues individual leases to particular client computers requesting access to the selected data having access managed by the computing device, wherein when the number of lease requests is at or beyond the request threshold, the computing device issues the scalable lease for the plurality of client computers to use the scalable lease to access the selected data having access managed by the computing device; and
  upon reaching the request threshold for requests received from the client computers to access the selected data, issuing the scalable lease by the computing device.

3. A method of claim 2, further comprising changing the request threshold based on at least one of:
  demand from the client computers for access to the selected data having access managed by the computing device;
  demand on the computing device responsible for responding to the lease requests from the client computers;
  an expiration time for the scalable lease; and
  likelihood of demand from the client computers for the selected data having access managed by the computing device based on prior demand from the client computers for the selected data.

4. A method of claim 1, further comprising:
  identifying, by the computing device managing access to the selected data, when access to the selected data is limited to authorized client computers;
  providing the scalable lease, by the computing device, to the authorized client computers for enabling a plurality of the authorized client computers to use the scalable lease to access the selected data having access managed by the computing device, wherein the providing the scalable leased is performed by one of:
  encrypting, by the computing device, the scalable lease wherein only the authorized client computers are capable of decrypting the scalable lease following the encrypting; and
  providing the scalable lease, by the computing device, only to the authorized client computers by selectively multicasting the scalable lease via a logical multi-cast tree including only client computers for which the scalable lease is intended.

5. A method of claim 1, further comprising broadcasting the scalable lease to all client computers.

6. A method of claim 1, further comprising distributing the scalable lease using a distributed data structure, including:
  transmitting the scalable lease, by the computing device, to at least one client computer that caches the scalable lease as a caretaking node from which other client computers obtain the scalable lease without sending a request to the computing device managing access to the selected data;
  configuring the caretaking node to cache the scalable lease on behalf of the other client computers; and
  making the caretaking node identifiable to the other client computers potentially seeking to obtain the scalable lease for accessing the selected data, wherein the other client computers obtain the scalable lease from the caretaking node without send a request to the computing device managing access to the selected data.

7. A method of claim 1, further comprising distributing the scalable lease by the computing device by multi-casting the sealable lease to a subset of the client computers, wherein the subset of client computers are configured to forward the scalable lease to additional client computers for enabling the additional client computers to use the scalable lease for accessing the selected data having accessed managed by the computing device.

8. A method of claim 1, further comprising selectively renewing the scalable lease, by the computing device, prior to an expiration time of the scalable lease, wherein a determination to selectively renew the lease includes the computing device considering at least one of:
- a number of requests received by the computing device for accessing the selected data having access managed by the computing device;
- a number of times the scalable lease has been renewed by the computing device;
- indication of a lack of continuing demand for access to the selected data; and
- receipt, by the computing device, of a request by one of the client computers for a lease conflicting with the scalable lease.

9. A method of claim 1, further comprising:
- receiving a request for a conflicting lease that conflicts with the scalable lease;
- transmitting a hold request message by the computing device to the client computers requesting that the client computers not send further lease requests or lease renewal requests during an interval during which the request for the conflicting lease will be honored;
- issuing, by the computing device, the conflicting lease to one of the client computers requesting the conflicting lease for a predetermined period of time;
- after the conflicting lease is returned or expires, issuing, by the computing device, a new scalable lease used by a plurality of the client computers for gaining concurrent access by the plurality of client computers to the selected data.

10. A method of claim 1, wherein the scalable lease includes one of:
- a blanket read lease;
- a black-box lease, wherein the black box lease enables a plurality of client computers party to the black box lease to use the black box lease to access the selected data and write to the selected data; and
- a controlled write lease configured to allow the selected data to be accessed by multiple client computers while preventing conflicting writes to the selected data.

11. Computer-readable storage media having a computer readable program code embodied therein, the computer readable program code adapted to be executed by one or more processors to implement a method allowing concurrent access to data over a network, the method comprising:
- configuring a server computing device to issue a blanket scalable lease used by a plurality of client computers for allowing more than one client computer to concurrently access selected data managed by the server computing device, wherein the scalable lease enables the plurality of client computers to access the selected data managed by the server computing device for a specified period of time during which the selected data is not changed by another entity;
- distributing the scalable lease from the server computing device over the network to one or more of the client computers;
- storing the scalable lease within one or more of the client computers on the network;
- upon a plurality of the client computers subsequently seeking access to the selected data managed by the server computing device, using the scalable lease by the plurality of client computers to access the selected data managed by the server computing device.

12. The computer-readable storage media of claim 11, further comprising determining a request threshold specifying a number of requests for the selected data received by the server computing device, at or beyond which the scalable lease is issued instead of issuing an individual lease to a requesting client computer to permit access to the selected data managed by the server computing device.

13. The computer-readable storage media of claim 11, further comprising restricting access to the scalable lease to authorized client computers by distributing the scalable lease only to client computers authorized to access the selected data by selectively multi-casting the scalable lease via a logical multi-cast tree including only client computers for which the scalable lease is intended.

14. The computer-readable storage media of claim 11, wherein access to the scalable lease is restricted by encrypting the scalable lease, wherein only client computers authorized to access the selected data are capable of decrypting the scalable lease.

15. The computer-readable storage media of claim 11, further comprising distributing the scalable lease including at least one of:
- broadcasting the scalable lease to all client computers;
- multi-casting the scalable lease to a subset of the client computers that will forward the scalable lease to additional client computers;
- selectively multi-casting the scalable lease via a logical multi-cast tree including only client computers for which the scalable lease is intended; and
- distributing and storing the scalable lease using a distributed data structure allowing the client computers to determine where the scalable lease is stored and to obtain the scalable lease.

16. The computer-readable storage media of claim 11, further comprising selectively renewing the scalable lease prior to an expiration time of the scalable lease based upon
- a number of requests received for the selected data;
- a number of times the scalable lease has been renewed;
- indication of a lack of continuing demand for the selected data; and
- receipt of a request for a lease conflicting with the scalable lease.

17. The computer-readable storage media of claim 11, wherein the scalable lease includes one of:
- a blanket read lease;
- a black-box lease, wherein the black box lease enables a plurality of client computers party to the black box lease to use the black box lease to access the selected data and write to the selected data; and
- a controlled write lease configured to be accessed by multiple client computers while preventing conflicting writes to the selected data.

18. A server comprising:
- one or more processors; and
- a memory containing instructions for configuring the one or more processors to control access to selected data managed by the server, wherein a plurality of client computers in communication with the server are configured to request access to the selected data by requesting a lease from the server for accessing the selected data for a period of time specified in the lease;
- wherein the one or more processors are further configured to receive a request for access to the selected data from a first one of the client computers;
- wherein the one or more processors are configured to issue an individual lease to the first client computer when a threshold for requests for issuing individual leases for access to the selected data has not been exceeded;

wherein the one or more processors are configured to receive a request for access to the selected data from a second one of the client computers, wherein the request from the second client computer is determined to exceed the threshold for requests for issuing individual leases for access to the selected data;

wherein following a determination that the threshold for requests for issuing individual leases is exceeded, the one or more processors are configured to issue a blanket scalable lease that is usable by the plurality of client computers for accessing the selected data;

wherein the scalable lease is distributed to the plurality of client computers for caching by the plurality of client computers, wherein the plurality of client computers use the scalable lease for accessing the selected data without having to request individual leases from the server.

19. The server of claim 18, wherein the one or more processors are further configured to broadcast the scalable lease to the plurality of client computers.

20. The server of claim 18, wherein the one or more processors are further configured to encrypt the scalable least prior to distributing the scalable lease to the plurality of client computers.

* * * * *